UNITED STATES PATENT OFFICE.

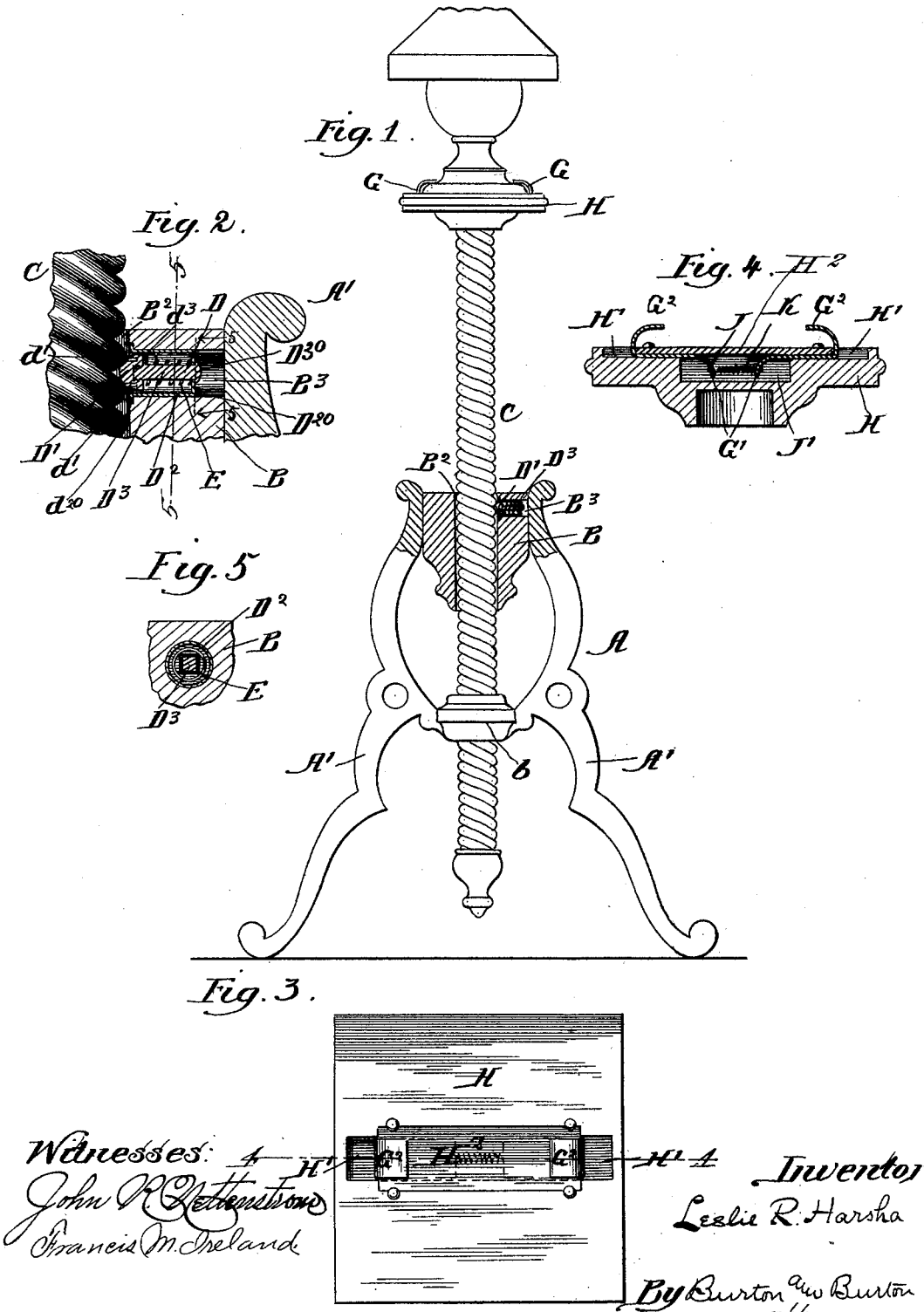

LESLIE R. HARSHA, OF CHICAGO, ILLINOIS.

ADJUSTABLE STAND.

SPECIFICATION forming part of Letters Patent No. 414,214, dated November 5, 1889.

Application filed January 19, 1889. Serial No. 296,798. (No model.)

*To all whom it may concern:*

Be it known that I, LESLIE R. HARSHA, a citizen of the United States, residing at Chicago, county of Cook, and State of Illinois, have invented certain new and useful Improvements in an Adjustable Stand, which are set forth in the following specification, reference being had to the accompanying drawings, forming a part thereof.

The purpose of this invention is to provide a stand especially designed for the purpose of supporting a lamp or vase, although suitable for other uses not involving the necessity of placing very great weight or pressure upon the stand.

In the drawings, Figure 1 is an elevation, partly sectional, at points involving operating mechanism relating specifically to my invention. Fig. 2 is an enlarged detail of the devices for locking and permitting the adjustment of the tablet-stem in its support. Fig. 3 is a plan showing a lamp or vase holding clamp in the tablet. Fig. 4 is a section at the line 4 4 on Fig. 3, and Fig. 5 is a section at the line 5 5 on Fig. 2.

The essential features of this invention are two—first, the devices for vertical adjustment; second, the devices for holding the lamp or vase on the tablet.

Of the devices for adjustment the essential feature is the stem of the tablet, made of rope-molding, and the support vertically pierced to admit the stem and having a spring-operated bolt, the head of which engages in the groove or grooves of rope-molding and serves as a detaining-dog, the spring being sufficiently powerful to hold the stem in its vertical bearing in the support firmly enough to prevent it and the tablet at the upper end of it from descending under the weight of the lamp or vase which the tablet supports, but capable of yielding to allow the bolt to recede and permit the bead of the rope-molding to pass it when the tablet is depressed with such amount of force as can be applied by the hand of the operator when it is desired to lower the tablet quickly.

A is the standard, of any desired form, but having, in whatever form it may be made, the vertical guide-bearing block B for the stem C, at the upper end of which is secured the horizontal tablet H. The block B should be of considerable length vertically to afford sufficient bearing for the stem, and it may or may not be supplemented by a second guide-bearing, as $b$, at a little distance from it. The block B is preferably made somewhat ornamental in exterior outline; but this is not material to the invention. The stem C is made in the form of rope-molding, whatever be the material employed, of such diameter as to fit not too easily, but at the same time not tightly, in the vertical aperture $B^2$ provided for it through the block B. In said block, transversely to the axis of the stem, I insert the bolt D, suitably incased, as hereinafter described, having the rounded head $D'$ protruding into the vertical aperture $B^2$. The size of the rounded head of this bolt is such as to adapt it to enter any one of the spiral grooves of the rope-molding, not, of course, entirely to the bottom of the groove, but sufficiently to be quite securely engaged therewith. The bolt D is provided with the cylindrical case $D^2$ and has a square stem $D^3$ screwed into it at the rear, and around said stem within the case $D^2$ a strong spring E is located, which is stopped at one end against the shoulder $d^3$ on the bolt and at the other end against the head or cap $D^{30}$ of the case $D^2$. The stem $D^3$ is inserted through said cap $D^{20}$, which has a square opening to admit the stem, and the stem has a head $D^{30}$, which stops outside the head $D^{20}$ of the bolt-case $D^2$, serving to check the action of the spring, thus retaining the bolt in the case. Preferably the socket which receives this bolt and its case is a round hole $B^3$, bored in the block B, leading from the vertical aperture $B^2$, and the bolt and its case are inserted from within—that is, through the aperture $B^2$—the case being provided with a flange $d^{20}$ at the inner end to stop it against the margin of the bolt $D^3$. It is most convenient to bore the hole $D^3$ from without, and to avoid the necessity of plugging this hole or otherwise concealing it on the exterior I sometimes secure one of the legs $A'$ of the support to the block B over the outer end of this hole, as illustrated in Fig. 1. The bolt-head $D'$ has two small notches $d'$ $d'$ at opposite sides, in which a spanner may be inserted to unscrew the bolt-head for the purpose of replacing a worn-out spring or other interior repairs. The square stem of the bolt, being engaged in the square opening through the cap $D^{20}$, is held from turning while the bolt-head is thus unscrewed and replaced.

The operation of so much as I have now described of this device is that the stem and the tablet thereon may be raised and lowered through the block B either by screwing the stem C up or down, the beads of the rope-molding serving as screw-threads and engaging the head of the bolt D; or whenever this mode of adjustment would be too slow for convenience, more force being applied than is exerted by the mere weight of the stem and tablet and that which ordinarily rests upon it, the stem may be forcibly pushed up or down through the block, the spring E permitting the bolt D to yield to permit the successive beads of molding to pass it, instead of compelling them to follow their spiral course, as in the screw movement.

In order to hold the lamp or vase with safety on the tablet, and in order to adapt it to hold lamps or vases having bases of different sizes, I provide the adjustable clamping device consisting of the hooks or clamps G. For this purpose the tablet H is recessed upon its upper side, said recess H' being deep enough to receive the clamps G and a securing-plate J above them. Midway in the length of this recess H' is formed a further deeper recess J', and the clamps G at one end have an offset G', which extends down into the recess J', the other end being provided with the hook or clamp jaw $G^2$, which stands above the surface of the tablet and is adapted to grasp the edge of the base of the lamp or vase thereon. The portion of the clamps between the offset G' and the hook or jaw $G^2$ is straight and rests and obtains slide-bearing on the tablet in the bottom of the recess H'. The securing-plate $H^2$ extends over the whole of the recess J and covers and conceals the portion of the clamps which extend thereinto, and said plate extends also longitudinally over the straight portion of the clamps and opposite and above the bottom of the recess H', in which the clamps have their slide-bearing, a sufficient distance, so that said clamps are effectively guided between said plate and the bottom of the recess without other bearings being provided. The securing-plate $H^2$ may be secured to the tablet by screws or nails inserted at the edge thereof and having their heads lapping the edge of the plate, or in any other convenient manner. The offsets G' of the clamps G in their normal position in the recess J are separated a short distance and connected by the extensible spring K, the length of the recess J being such as to allow the clamps to be separated such additional amount as the extensibility of the spring will permit and bear without distortion.

The operation of this device is obvious. The jaws or hooks of the clamps $G^2$ seize between them the base of the lamp or vase, and the spring K causes them to hold it firmly, while the extensibility of the spring and longitudinal adjustability of the clamps in the slide-bearings provided for them adapt the device to hold securely lamps or vases having their bases differing considerably in width, and the range of adjustability and extensibility of the clamping-jaws and spring, respectively, can be made such as to meet all ordinary requirements.

I do not limit myself to the use of the spring K as a means of holding the clamps against the lamp-base which they are designed to grasp, although I regard this as a desirable means for that purpose; but the principal feature of this device is the adjustability of the clamps to adapt them to grasp different sizes of lamp-bases. Neither do I regard it as essential that the jaws $G^2$ of the clamps should be hooked, as illustrated, although this, also, is a desirable form and adds to the security of the lamp which may be grasped between the jaws; but, provided the jaws are held against the edge of the base with sufficient firmness, the hooked form may be dispensed with.

I claim—

1. An adjustable stand comprising a fixed standard having a guide-bearing for the tablet-stem, a tablet having a rope-molded stem inserted through said bearing, and a spring-actuated bolt supported by the bearing and protruding against the rope-molding and having its head adapted to enter the grooves thereof, substantially as set forth.

2. In combination, substantially as set forth, a standard comprising the block B and supporting-legs secured thereto, a tablet having a rope-molded stem passing through the block B, the block having the hole $B^3$, and the spring-actuated bolt inserted in such hole and having its head protruding into one of the molding-grooves of the stem, one of the supporting-legs of the standard being secured to the block covering the exterior end of the hole, substantially as set forth.

3. In combination with the bolt-case $D^2$, having a square opening through its head or cap, the square bolt-stem inserted from the rear through the square opening and having a head outside the cap, the bolt-head inserted into the case at the opposite or open end and screwed onto the stem, and the spring interposed between the bolt-head and the case-head, substantially as and for the purpose set forth.

In testimony whereof I have hereunto set my hand, in the presence of two witnesses, at Chicago, Illinois, this 15th day of January, 1889.

LESLIE R. HARSHA.

Witnesses:
 CHAS. S. BURTON,
 JOHN R. NETTENSTROM.